Patented May 16, 1939

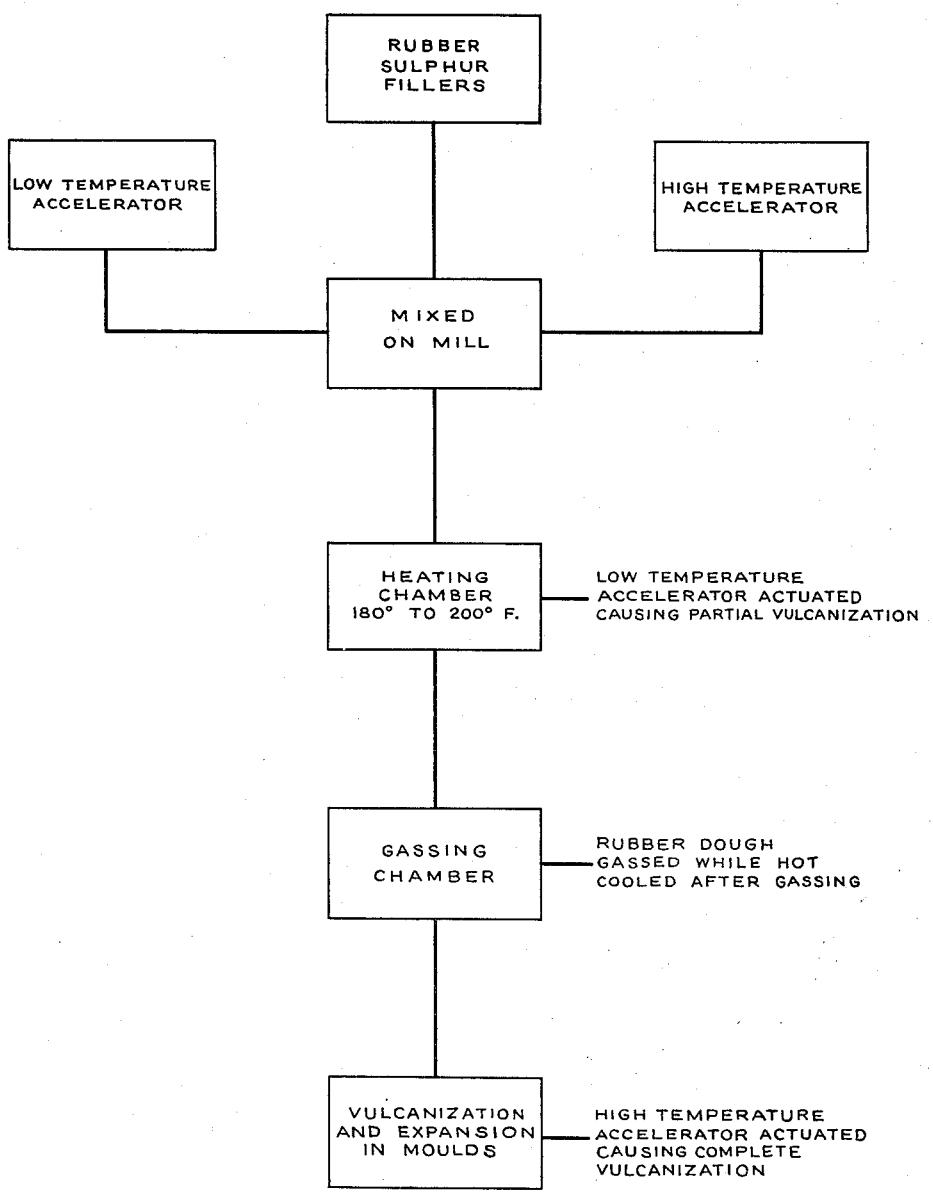

2,158,083

UNITED STATES PATENT OFFICE 2,158,083

PROCESS OF MANUFACTURING EXPANDED RUBBER

Frederick William Peel, London, England, assignor to Rubatex Products, Inc., New York, N. Y., a corporation of Delaware Application August 22, 1936, Serial No. 97,418

9 Claims. (Cl. 18—53)

This invention relates to novel methods of manufacturing gas-expanded rubber.

The manufacture of gas-expanded rubber comprises subjecting a suitable rubber mixture to an inert gas at a very high pressure and entrapping the gas within the rubber as small individual gas cells. Good quality gas-expanded rubber must have a homogeneous structure, the individual gas cellular structure being of uniform size and evenly distributed throughout the rubber mass. The gas expanded rubber product may be soft or hard according to the composition used. The material may be molded into any shape or form. Gas expanded rubber is completely water-proof, is buoyant due to its light weight, is a good thermal insulator and possesses marked acoustic absorption qualities.

Gas-expanded rubber, despite its many valuable commercial qualities, has not gone into extensive industrial use. It could not heretofore be placed on a competitive market with plain rubber, cork, 'Celotex' and the like. The primary object of this invention is to provide a novel process for reducing the cost of the manufacture of gas-expanded rubber products.

The process for manufacturing gas-expanded rubber heretofore widely accepted as the most practical method for commercial production is the so-called two stage process. Such a process is the basis of the United States Patent No. 1,905,269, dated April 25, 1933, to Denton, and the co-pending application Serial No. 717,550 filed March 27, 1934, of which I am a co-inventor. In the two-stage process, the rubber dough is gassed in an autoclave at a pressure of the order of 3000 pounds per square inch and simultaneously heated to effect a partial vulcanization of the rubber to retain the adsorbed gas cells on removal from the autoclave, and subsequently finally cured and expanded in suitable molds or containers.

An autoclave is a steam-jacketed gassing chamber. The chamber is heated by steam at a pressure of about eight pounds per square inch to raise its walls to a temperature of 113° C. Precautions must be taken to uniformly heat the rubber and not to overcure any portion of it. It is difficult to avoid possible undercuring of the internal portions of the dough charge if the outer portions are not to be over-heated. In practise the gassing chambers are therefore not charged beyond one-third of their full volume capacity and the charge is centrally located, so as not to be too near the chamber walls.

The factors which rendered the prior processes commercially expensive were that the gassing chamber was operated at one-third its nominal capacity and that the gassing period was relatively long, requiring about 1½ to 2 hours for soft, and about 7 to 9 hours for hard gas-expanded rubber. Since the autoclaves together with the auxiliary apparatus are highly expensive units, a large investment was necessary for each unit. The large initial expense together with the high maintenance cost for the 3000 pound per square inch compressor, valves and fittings, coupled with the low operating production efficiency, raised the unit cost of the gas-expanded rubber product.

In accordance with my invention, I contemplate pre-heating the rubber dough to render it plastic before insertion in the gassing chamber. The dough is homogeneously pre-cured in a room heated to a temperature of about 180° F. to 200° F. The pre-cured dough is then placed into the gassing chamber and subjected to an inert gas at a pressure of the order of 3000 pounds per square inch for thorough gassing.

I have found that the gassing period is reduced to at least one-third the time heretofore required when simultaneous heating of the charge was carried out. A further important commercial advantage of pre-curing the dough resides in that the full capacity of the gassing chamber is utilized by a charge substantially filling the gassing chamber. Since the autoclave is not heated for partially curing the dough, no danger of overheating any portion of the charge is encountered and the whole chamber is available for gassing pre-cured dough. The final stage of my novel process is similar to the second stage of the two-stage processes, namely, final vulcanization and expansion in a suitable mold.

I have also discovered that by utilizing two accelerators in the rubber dough, independently effective at the two heating stages, the efficiency of my process is materially increased. By using an accelerator such as Vulcaid P. (piperidine pentamethylene) effective at the pre-curing temperature, the dough is efficiently rendered plastic and the adsorbed inert gas is effectively retained within the dough between the gassing and final curing stages. Diphenylguanidine, as the second accelerator, is effective during the final vulcanization temperature.

Accordingly, in accordance with my present invention, the utilization of the autoclave is increased at least nine or ten times over that of prior systems, when calculated on a charge-hourly basis.

It is accordingly an object of my present invention to provide a novel three-stage method for manufacturing gas-expanded rubber.

It is another object of my invention to increase the production utilization of the autoclave and auxiliary equipment in the manufacture of gas-expanded rubber.

It is still another object of my invention to reduce the time required for gassing a rubber charge in the manufacture of gas-expanded rubber.

It is a further object of my invention to increase the charging capacity of the gassing chamber in the manufacture of gas-expanded rubber.

It is another object of my invention to provide a novel process for manufacturing gas-expanded rubber of very high quality at a competitive price.

It is still a further object of my invention to provide a novel process for manufacturing gas-expanded rubber using two distinct accelerators independently effective at the pre-curing and finally curing stages.

These and other objects of my invention will be described in the following detailed description of the production of a preferred soft and hard gas-expanded rubber product.

For articles of soft gas-expanded rubber, the exemplary compound or composition comprises the following:

|  | Pounds | Ounces |
|---|---|---|
| Pale crepe | 33 | 0 |
| Light cal. magnesium |  | 15 |
| Lithopone | 6 | 0 |
| Mag. oxide HY | 6 | 9 |
| Paraffin wax |  | 15 |
| Zinc oxide | 2 | 1 |
| Sulphur | 1 | ½ |
| Vulcaid P. (Piperidinium pentamethylene dithiocarbamate) |  | ¾ |
| D. P. G. |  | 4½ |
| Agerite powder |  | 6¾ |
| Carbon black |  | 1½ |

For articles of hard gas-expanded rubber, the exemplary compounds or composition comprises the following:

|  | Pounds | Ounces |
|---|---|---|
| Rubber | 48 | 0 |
| Sulphur | 24 | 0 |
| Gilsonite | 12 | 0 |
| Rupron | 12 | 0 |
| Light cal. magn. pentamethylene dithiocarbamate |  | ½ |
| D. P. G. |  | 2 |

The rubber and the other ingredients are mixed on the mill in a manner well known in the art to prepare the rubber dough. The dough is then placed in suitable containers or coiled spring steel sheeting.

In the first stage of my process, the dough is pre-cured in a room or chamber at a temperature of the order of 180° F. to 200° F. The dough within the containers or coils is placed in the heated chamber for a predetermined period dependent upon the bulk of the dough until a uniform and steady state heating of the dough is effected. The heating period may range from a half hour to two hours. The dough during this first stage becomes plastic and also causes the accelerator Vulcaid P. (piperidine pentamethylene) to be fully active. A very large bulk of dough within separate containers may accordingly be homogeneously pre-cured at very little cost.

The second stage of my novel process consists in gassing the plastic and pre-cured dough with a neutral gas at a high pressure. It is important that the pre-cured dough not be chilled or otherwise reduced in temperature between the first and second stages. The walls of the autoclave are accordingly heated to approximate the temperature of the dough to avoid chilling thereof. This can be done in a short time, for example, by blowing steam into the open chamber before introducing the dough.

The doors of the gassing chamber are sealed after the pre-cured charge is placed therein. It is to be understood that the charge may comprise substantially the whole volume of the gassing chamber since no heat transfer is required during the second stage. A neutral or inert gas, for example, nitrogen, is admitted to the chamber at a pressure of the order of 3,000 pounds per square inch. The gas is readily adsorbed by the plastic dough. The soft rubber mixture will be sufficiently gassed in a period of about one-half hour; the hard rubber mixture, for a period of from two to four hours.

When the dough is completely gassed, it is desirable to cool the chamber together with the dough as rapidly as possible to a temperature of about 60° F. This may be effected by circulating cold water through a jacket provided within the cylinder. The gas pressure is reduced to atmospheric pressure and the containers or coils containing the gassed and partially vulcanized dough are removed from the gassing chamber. The rubber is released from the containers or coils and it expands a considerable amount due to the pressure of the confined individual gas cells, and is then ready for the third and final stage of my novel process.

The first and second stages of my novel process produce a gas-expanded pre-cured dough which is similar to the first stage of the prior two-stage processes. However, a uniformly high quality is assured by my novel process due to the independent pre-curing and gassing without danger of uneven heating or over-heating of the dough. The pre-curing is effected in a heated, inexpensive room or chamber at atmospheric pressure and atmospheric gaseous content. The gassing plant is utilized to a maximum capacity since the gassing is carried on independent of the partial vulcanization so that 100% capacity charges are used. The relatively small period of charging reduces the cost per unit weight of product considerably, since the high cost of the plant is economically utilized. I have found that ten times the production of gas-expanded rubber products is possible with substantially the same investment of gassing equipment as compared to prior processes, greatly reducing the cost of production of the products to place them on a competitive basis in the open market with materials of similar properties.

The third stage of my novel process is the final vulcanization and expansion stage carried on in molds and is similar to the second stage of the prior two-stage processes. The gassed partially vulcanized dough is placed into large containers of suitable shape or again rolled into coils or placed in suitable molds and is subjected to the action of adequate vulcanizing heat for a period sufficient to complete the vulcanization and also further expand the dough to completely fill the confining molds or containers in a manner well known to those skilled in the art. The second accelerator, namely, D. P. G. is rendered active at the final vulcanization temperatures.

Although I have described specific rubber compounds and preferred operating parameters to carry out my process, it will be evident that modifications are feasible and the actual temperatures, gas pressures and periods of operation depend to some extent upon the composition and bulk of the rubber dough, and accordingly I do not intend to be limited except as set forth in the following claims.

I claim:

1. In the process of manufacturing gas expanded rubber from rubber dough, the steps of incorporating a low temperature accelerator in the dough in such quantity as to produce partial vulcanization of the rubber upon heating, heating the dough to a temperature for rendering the low temperature accelerator fully active to partially vulcanize the dough, and subsequently gas impregnating the plastic dough with an inert gas.

2. In the process of manufacturing gas expanded rubber from rubber dough, the steps of incorporating a low temperature accelerator in the dough in such quantity as to produce partial vulcanization of the rubber upon heating, heating the dough at atmospheric pressure to a temperature for fully activating the low temperature accelerator and for rendering the dough plastic and partially vulcanized, and subsequently gas impregnating the plastic, partially vulcanized dough with a neutral gas.

3. In the process of manufacturing gas expanded rubber from rubber dough, the steps of incorporating a low temperature accelerator in the dough in such quantity as to produce partial vulcanization of the rubber upon heating, heating the dough at atmospheric pressure to a temperature for fully activating the low temperature accelerator and for rendering the dough plastic and partially vulcanized, and subsequently gas impregnating the heated plastic partially vulcanized dough with a neutral gas.

4. In the process of manufacturing gas expanded rubber from rubber dough, the steps of incorporating a low temperature accelerator in the dough in such quantity as to produce partial vulcanization of the rubber upon heating, heating the dough at atmospheric pressure to a temperature for fully activating the low temperature accelerator and for rendering the dough plastic and partially vulcanized, and subsequently gas impregnating the heated plastic, partially vulcanized dough with a neutral gas at a pressure of the order of 3000 pounds per square inch, and then rapidly cooling the gassed dough to a temperature of the order of 60° F.

5. The method of manufacturing gas-expanded rubber which comprises incorporating a low and a relatively higher temperature accelerator in the rubber dough, said low temperature accelerator being present in such quantity as to partially vulcanize the rubber upon heating, heating the dough for rendering the dough plastic, gas impregnating the heated plastic dough with a neutral gas, removing the excess gas, and finally vulcanizing the gassed dough.

6. The method of manufacturing gas-expanded rubber which comprises incorporating a low and a relatively high temperature accelerator in the rubber dough, said low temperature accelerator being present in such quantity as to partially vulcanize the rubber upon heating, heating the dough at atmospheric pressure to a temperature for rendering the dough plastic, gas impregnating the plastic dough with a neutral gas without chilling the dough, removing the excess gas, and finally vulcanizing and expanding the gassed dough in suitable molds.

7. The method of manufacturing gas-expanded rubber which comprises incorporating a low and a relatively high temperature accelerator in the rubber dough, said low temperature accelerator being present in such quantity as to partially vulcanize the rubber upon heating, heating the dough at atmospheric pressure to a temperature for fully activating the low temperature accelerator to effect a partial vulcanization of the rubber dough to render the dough plastic, gas impregnating the plastic and partially vulcanized dough with a neutral gas without chilling the dough, subsequently rapidly cooling the gassed dough, removing the excess gas, and finally vulcanizing and expanding the gassed dough in suitable molds at a temperature for rendering the higher temperature accelerator fully active.

8. The method of manufacturing gas-expanded rubber which comprises incorporating a low and a relatively high temperature accelerator in the rubber dough, said low temperature accelerator being present in such quantity as to partially vulcanize the rubber upon heating, heating the dough at atmospheric pressure to a temperature for fully activating the low temperature accelerator to effect a partial vulcanization of the rubber dough and to render the dough plastic, gas impregnating the plastic and partially vulcanized dough with a neutral gas at a pressure of the order of 3000 pounds without chilling the dough, and subsequently rapidly cooling the gassed dough to a temperature of the order of 60° F. and removing the excess gas, and finally vulcanizing and expanding the gassed dough in suitable mold at a temperature for rendering the higher temperature accelerator fully active.

9. The method of manufacturing gas-expanded rubber which comprises incorporating a low and a relative high temperature accelerator in the rubber dough, said low temperature accelerator being present in such quantity as to partially vulcanize the rubber upon heating, heating the dough at atmospheric pressure to a temperature of the order of 180° F. for fully activating the low temperature accelerator to effect a partial vulcanization of the rubber dough and to render the dough plastic, gas impregnating the plastic and partially vulcanized dough with nitrogen gas at a pressure of the order of 3000 pounds without chilling the dough, and subsequently rapidly cooling the gassed dough to a temperature of the order of 60° F. and removing the excess gas, and finally vulcanizing and expanding the gassed dough in suitable molds at a temperature for rendering the higher temperature accelerator fully active.

FREDERICK WILLIAM PEEL.